Nov. 15, 1955

W. E. GERMER 2,723,558

ELECTRICAL INDICATING APPARATUS FOR
CONTROLLING BOILER PLANT OPERATION

Filed Sept. 25, 1951

INVENTOR
Wilhelm E. GERMER

By

ATTORNEY.

INVENTOR
Wilhelm E. GERMER
BY
ATTORNEY

Nov. 15, 1955 W. E. GERMER 2,723,558
ELECTRICAL INDICATING APPARATUS FOR
CONTROLLING BOILER PLANT OPERATION
Filed Sept. 25, 1951 4 Sheets-Sheet 4

INVENTOR
Wilhelm E. GERMER
BY
ATTORNEY

United States Patent Office 2,723,558
Patented Nov. 15, 1955

2,723,558

ELECTRICAL INDICATING APPARATUS FOR CONTROLLING BOILER PLANT OPERATION

Wilhelm Eduard Germer, Dusseldorf, Germany

Application September 25, 1951, Serial No. 248,182

3 Claims. (Cl. 73—112)

The instant invention relates to apparatus for controlling the operation of boiler plants by regulating, in accordance with the excess air supplied to support the combustion, at least one of the two mediums, fuel and air, participating in the combustion.

Combustion control in terms of excess air supplied to boiler plants to support combustion is presently based mainly on the determination of the carbon dioxide or oxygen percentage of the flue gas. This method, which has been followed heretofore, has the disadvantage that the carbon dioxide or oxygen percentage measurement or indication involves no great degree of accuracy. The main reason for this defect lies in the fact that too small a sample of flue gas is used for such determination, that the sample is taken but from one definite region of the flue gas flow, and that the measuring instruments are positioned directly in the path of the flue gas and hence continuously exposed to contamination by dirt. For these reasons, erroneous and unreliable results are frequently obtained.

The object of the instant invention is to provide an apparatus by which the efficiency of operation of boiler plants is more accurately determinable by continuous measurement of the useful heat generated, the magnitude of the flue gas flow, and the temperature of each the intake air and of the flue gas.

Still a further object is to provide electrical apparatus which continuously compares predetermined ones of accurately measured magnitudes involved in the operation of boiler plants to furnish a quotient or product indicative of the operation of the boiler plants, and by virtue of which indications the operator of the plant may know what adjustments require to be made.

The instant invention is based on the following considerations: The portion $E$ of the energy of a fuel actually transformed into heat is in one of three forms, useful heat $E_1$, flue gas heat $E_2$, and heat losses $E_3$ due to conduction and radiation. The heat losses $E_3$ are relatively small for all heating plants and, for both large and medium sized plants, vary only between 1% and 2% of the total transformable energy $E$. Assuming that $E_3$ is 2%, $E$ may be expressed as $$E = \frac{E_1 + E_2}{0.98}$$

But $E$ can also be expressed as $E = B \cdot H_u$, where $B$ is the weight in kilograms of the fuel and $H_u$ is the lower caloric value of the fuel in kilocalories per kilogram. If $V$ denotes the flue gas volume in Nm.$^3$ for one kilogram of fuel at a certain factor $n$ of excess air, and $G$ the total volume in Nm.$^3$ of flue gas, where Nm.$^3$ means normal cubic meters, that is cubic meters at 0° C. and 760 mm. of mercury, one can write:

$$G = B \cdot V = \frac{E}{H_u} \cdot V = \frac{E_1 + E_2}{0.98} \cdot \frac{V}{H_u}$$

or $$\frac{V}{H_u} = \frac{0.98 \cdot G}{E_1 + E_2}$$

This equation is valid only where the heat losses total 2%. As the heat losses vary but slightly with different boilers, the last equation may be written $$\frac{V}{H_u} = k_1 \cdot \frac{G}{E_1 + E_2}$$

The expression $$\frac{V}{H_u}$$

represents a well known fuel value, characterizing the change in the amount of flue gas for a change in the caloric heat value of the fuel, and showing, furthermore, that a fuel of the same kind will always furnish the same amount of flue gas for the same fuel energy in kilocalories. It is, consequently, immaterial whether a fuel with lower caloric value but in proportionally larger amount, is used for combustion, or a fuel with a higher caloric heat but in smaller amount. In both cases the amount of flue gas produced with the same amount of excess air will always be the same providing only that the supplied fuel energy ($B \cdot H_u$) has the same value. This is valid for all fuels of the same kind, as for example the whole group of coal, anthracite, coke and heating gases above a lower caloric value of 3000 kilocalories per normal cubic meter (Nm.$^3$). For fuels of lower caloric values, such as lignites or bituminous coal, the same observation prevails providing the fuel is of the same kind or comes from the same source. In such case also, a change in the caloric value will not make any difference in the amount of flue gas. Hence the flue gas volume $G$ of a combustion plant remains constant for a given amount of excess air just so long as fuel of the same group is used for combustion and as long as the sum of the useful heat $E_1$ and the flue gas heat $E_2$ remains constant.

From these considerations we can derive that the excess air remains constant at the same flue gas flow and the same total of useful heat plus flue gas heat even if the caloric value of the fuel varies. Furthermore, we can derive that changes in the flue gas flow, or changes in $E_1 + E_2$, result in a change of the excess air. The product $$k_1 \cdot \frac{G}{E_1 + E_2}$$

is consequently proportional to the amount of excess air. The real value of the excess air $n$ can be found thus: Letting $L_0$ be the air in Nm.$^3$ required for ideal combustion, $n \cdot L_0$ the air required for combustion with excess air of 1 kilogram of fuel, and $L$ the total air actually used for the combustion of all the fuel, the following relation can be formulated:

$$\frac{n \cdot L_0}{H_u} = \frac{L}{E}$$

in which $$\frac{n \cdot L_0}{H_u}$$

is the quotient for one kilogram of fuel, and $L/E$ that for the total fuel transformed into heat. Substituting for $E$ the value $$\frac{E_1 + E_2}{k_1}$$

we obtain $$n = k_1 \cdot \frac{H_u}{L_0} \cdot \frac{L}{E_1 + E_2}$$

For any definite kind of fuel $H_u/L_0$ is a constant which we can designate $k_2$, the relation becoming $$n = k_1 \cdot k_2 \cdot \frac{L}{E_1 + E_2}$$

But in this equation the amount of air L in normal cubic meters per second can be expressed in terms of the total flue gas flow G in normal cubic meters per second. Designating the amount of flue gas produced by one kilogram of fuel at any combustion with excess air by V, the relation obtains:

$$\frac{L}{G} = \frac{n \cdot L_0}{V}$$

or $$L = \frac{n \cdot L_0}{V} \cdot G$$

in which V can be expressed by $V = V_0 + (n-1) \cdot L_0$, where $V_0$ is the amount of flue gas at ideal combustion of one kilogram of fuel. Inserting these values of L and V in the equation for $n$:

$$n = k_1 \cdot k_2 \cdot \frac{n \cdot L_0}{V_0 + (n-1) \cdot L_0} \cdot \frac{G}{E_1 + E_2}$$

$$\frac{V_0 - L_0 + n \cdot L_0}{L_0} = k_1 + k_2 \cdot \frac{G}{E_1 + E_2}$$

$$n = k_1 \cdot k_2 \cdot \frac{G}{E_1 + E_2} - \frac{V_0 - L_0}{L_0} \quad (1)$$

The flue gas heat $E_2$ of a heating plant may be expressed by $$E_2 = G \cdot (t_g - t_1) \cdot C_{pm} \quad (2)$$

in which G denotes the amount of flue gas in normal cubic meters at the measuring nozzle, $t_g$ the flue gas temperature at such nozzle, $t_1$ the temperature of the intake air used for combustion, and $C_{pm}$ is the mean specific heat of the flue gas between 0° C. and 200° C. in kilocalories per normal cubic meter.

Substituting (2) in (1), we have $$n = k_1 \cdot k_2 \cdot \frac{G}{E_1 + G \cdot (t_g - t_1) C_{pm}} - \frac{V_0 - L_0}{L_0} \quad (3)$$

The flue gas will preferably be measured by a gas flow meter without any correcting element for variations in the flue gas temperature. Hence, as the flue gas temperature changes with longer service and with boiler load, it will be necessary to correct the measurement of the flue gas flow for the errors involved. Designating the flue gas temperature at mean load at the time of calibrating the meter by $t_{g0}$ and at any other time by $t_g$ in degrees centigrade, the corrected value of the flue gas is obtained by multiplying the measured value of G by the factor $$\sqrt{\frac{273 + t_{g_0}}{273 + t_g}}$$

Introducing the correction factor, we thus have $$n = k_1 \cdot k_2 \cdot \frac{1}{\frac{E_1}{G \cdot \sqrt{\frac{273 + t_{g_0}}{273 + t_g}}} + (t_g - t_1) \cdot C_{pm}} - \frac{V_0 - L_0}{L_0}$$

$$= k_1 \cdot k_2 \cdot \frac{1}{\frac{E_1}{G} \sqrt{\frac{273 + t_g}{273 + t_{g_0}}} + (t_g - t_1) \cdot C_{pm}} - \frac{V_0 - L_0}{L_0} \quad (4)$$

Substituting $k_3$ for $$\frac{V_0 - L_0}{L_0}$$

which obviously is a constant, $$n + k_3 = k_1 \cdot k_2 \cdot \frac{1}{\frac{E_1}{G} \sqrt{\frac{273 + t_g}{273 + t_{g_0}}} + (t_g - t_1) \cdot C_{pm}}$$

$$n = k_1 \cdot k_2 \cdot \frac{1}{\frac{E_1}{G}} \cdot \frac{1}{\sqrt{\frac{273 + t_g}{273 + t_{g_0}}} + \frac{(t_g - t_1) \cdot C_{pm}}{\frac{E_1}{G}}} - k_3 \quad (5)$$

$$= k_1 \cdot k_2 \cdot \frac{1}{\frac{E_1}{G}} \cdot f(t) - k_3 = k_1 \cdot k_2 \cdot \frac{G}{E_1} \cdot f(t) - k_3 \quad (6)$$

where the factor $f(t)$ is a temperature function but slightly influenced by changes in the value $E_1/G$ as readily follows from the above. The square root portion of $f(t)$ has a value of approximately 1.0, while the second term of its denominator (compare Equation 5 above) approximates about 0.10. Closer investigation demonstrates that the fraction $E_1/G$ changes quite uniformly with the value $n$ of excess air, and with the lower caloric value of the fuel. Introducing a mean constant value for $E_1/G$ in the temperature factor $f(t)$, the total value of the denominator thereof will vary from a mean value of 1.10 to one of between 1.08 and 1.12 for changes of plus or minus 20% variation in the amount of excess air $n$, that is, in the actual value of $E_1/G$ in the function $f(t)$. Hence Equation 6 contains two independent variables: the quotient of the flow meters (G and $E_1$), and the temperature factor $f(t)$. It further follows that Equation 5 permits of an exact and reliable determination of the excess air by measurement of the useful heat, the flue gas flow, the flue gas temperature, and the temperature of the intake air supporting the combustion; and that this determination has a considerably higher accuracy than any determination based on the carbon dioxide or oxygen measurement, since the instant determination is based on the nearly complete fuel energy, actually 98%, generated by the combustion.

Hence the invention comprises a differential pressure flow meter, without any temperature correcting element, for each the flue gas and the carrier, usually steam, of the useful heat, and a thermometer for each the flue gas and the intake air supporting combustion, all of which are combined appropriately in an electrical circuit supplying a quotient meter or meters of which the calibration, whether it be a visual scale, a recording chart or a counter, is calibrated according to Equation 5 above.

The foregoing, and other objects, features and advantages of my instant invention will be more fully understood from the following detailed description of an illustrative embodiment when read in conjunction with the appended drawing in which:

Figure 1 discloses an elevational schematic, highly simplified, of a boiler plant incorporating an illustrative embodiment of the measuring and controlling equipment of my invention;

Figure 1:
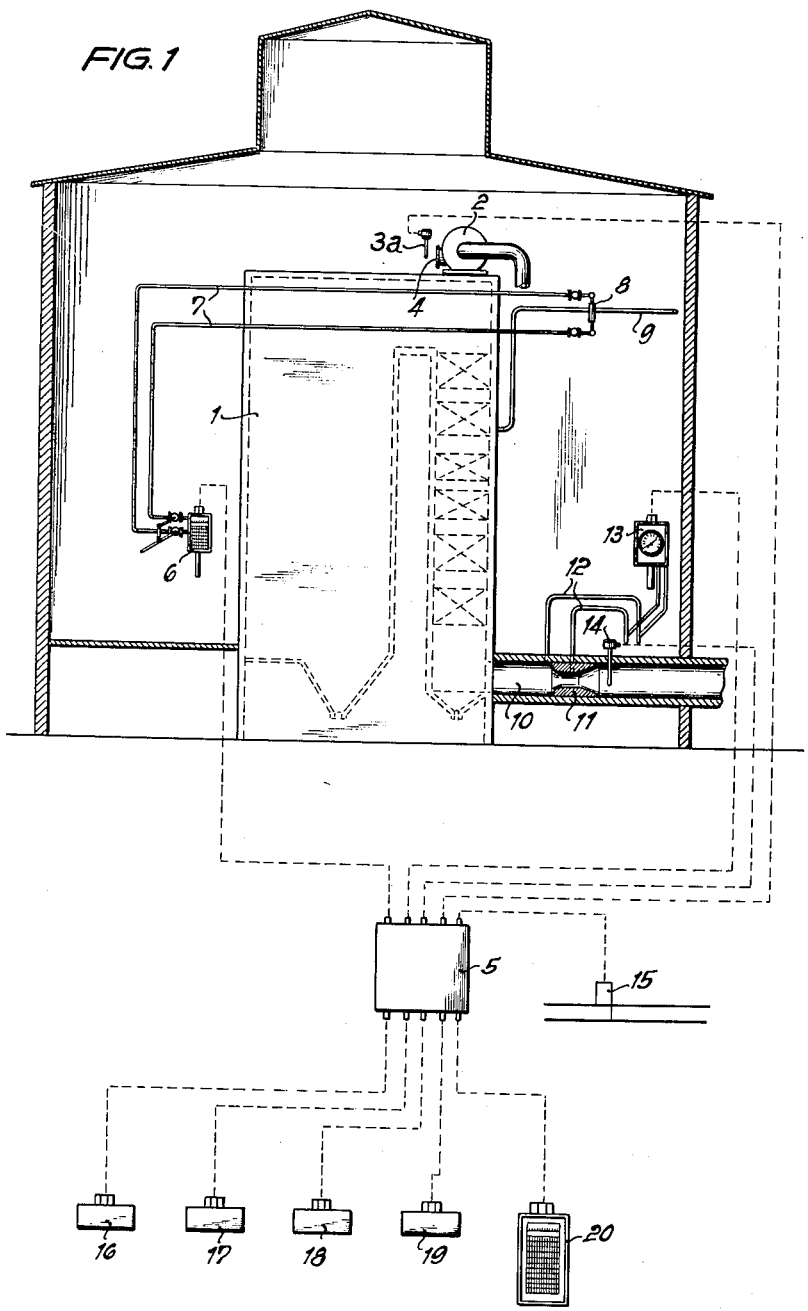

As shown in Figure 1, the boiler 1 is provided with a supply air blower 2 for inducting ambient air into the combustion chamber in well known manner. An electrical resistance thermometer, having independent electrical resistances 3 and 3a, located at the intake 4 of the blower 2 is electrically connected to the electrical bridge apparatus 5 of my invention, of which the details are hereinafter described. A steam flow meter 6 is connected by piping 7 to an orifice 8 conveniently located in the steam pipe 9 to measure the flow of steam, the flow meter 6 being adapted to actuate the sliding contact of a first voltage divider of the electrical apparatus 5. In the flue gas channel 10 a nozzle 11 is connected by way of the plus and minus connecting pipes 12 to the flue gas meter 13 adapted to actuate the sliding contact of a second voltage divider of the apparatus 5. An electrical resistance thermometer 14 extends into the flue gas channel and is electrically connected to the apparatus 5. A power source 15, which may be a transformer connected to an A. C. line and feeding into a rectifier, supplies the required D. C. potential for apparatus 5. Apparatus 5 may appropriately be provided with a plurality of direct reading quotient meters or recorders or counters, for example an efficiency indicator 16, an excess air indicator 17, a flue gas flow indicator 18, a steam flow indicator 19, and an efficiency recorder 20, electrically connected to appropriate circuit portions and elements of apparatus 5 as hereinafter described.

Figure 2:
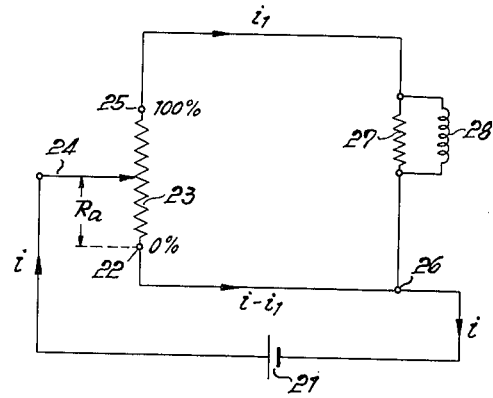
Figures 2 and 3 are electric circuit diagrams useful in explaining the electrical circuit of the measuring equipment of my invention.
Figure 3:
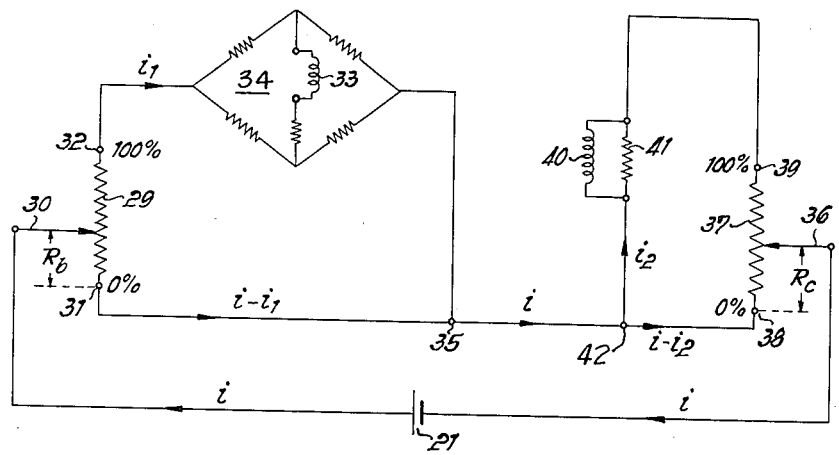
Figure 4:
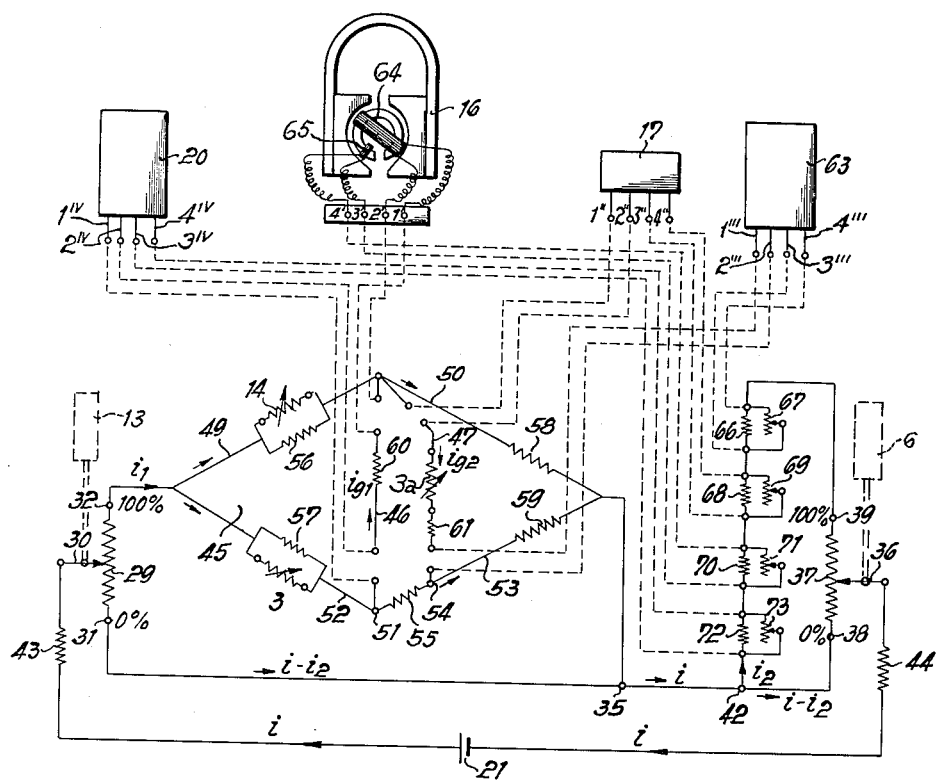
Figure 4 is the electrical circuit diagram of the illustrative embodiment of my invention using individual meters for indicating excess air and efficiency measurements, respectively.

As has been stated, the actual circuit diagram of apparatus 5 is shown in Figure 4, but before describing such complete circuit it appears advisable to explain the schematic circuits of Figures 2 and 3 showing elemental portions of the complete circuit. Referring to Figure 2, a source of D. C. potential 21 is connected between a fixed terminal 22 of a resistance 23 and a slide contact 24, displaceable between the fixed end terminals 22 and 25 of the resistor 23, is mechanically actuatable, for example by a flow meter, such that the slide contact 24 is on terminal 22 for zero or minimum flow through the meter and is on terminal 25 for maximum flow therethrough. In shunt between the fixed terminal 25 and a point 26 in the connector between the fixed terminal 22 and the source 21, there is connected a resistor 27 of appropriate value, resistor 27 in turn being in shunt of the rotatable coil 28 of the galvanometer. Assuming that the total resistance of the circuit between the slide contact 24 and point 26 is R, while that between the terminal 22, corresponding to zero flow of any medium through the flow meter actuating the slider 24, and any position of the slide contact 24 is $R_a$, $i$ being the total current, a partial current $i_1$ will flow in the branch circuit 24, 25, 27 and 26, and the remainder $i-i_1$ will flow in the branch circuit 24, 22 and 26. From this it follows that $$i_1 = \frac{R_a}{R} i$$

that is, the current $i_1$ from the terminal 25 of maximum flow of the medium is directly proportional ot the actual flow of median, steam or flue gas in the instant case, through the meter actuating the slider contact 24.

The circuit schematic to Figure 3 shows two potential dividers of the type of divider 23 of Figure 2, connected to the common source of D. C. potential 21. The potential divider 29 has its slider or brush contact 30 actuated by mechanical connection to a flue gas flow meter, for example 13 of Figure 1, so that with zero or minimum flow of flue gas, brush 30 is on fixed terminal 31 and for maximum flue gas flow on fixed terminal 32. The coil 33 of a measuring galvanometer is here shown in the diagonal of a Wheatstone bridge 34, the bridge in turn being connected between terminal 32, corresponding to maximum flue gas flow, and a common point 35 connected to terminal 31, corresponding to zero flue gas flow, through a portion of resistor 29 and slider 30 to one side of D. C. source 21. The other side of D. C. source 21 is connected to the slider contact 36 of the potential divider resistor 37, the slider contact 36 being actuated by a mechanical connection to a steam flow meter, for example 6 of Figure 1, between fixed terminal 38 thereof, corresponding to zero or minimum steam flow through the meter, and fixed terminal 39, corresponding to maximum steam flow through the meter. Fixed terminal 38 is connected by a conductor to the common point 35, while fixed terminal 39 is connected through the coil 40 and its shunt resistor 41 of a galvanometer to a second common point 42 on the conductor connecting the fixed terminal 38 and the common point 35. Hence if $R_1$ be the total resistance of the circuit from source 21 to a common point 35, $R_b$ the resistance between terminal 31 and slider 30, $R_2$ the total resistance from source 21 to common point 42, $R_c$ the resistance between terminal 38 and slider 36, and $i$ the total current, then the current in the branch, terminal 32, bridge 34 and common point 35 can be designated $i_1$, and that in the branch from terminal 39 through galvanometer coil 40 and resistor 41 to the common point 42 as $i_2$, then $$\frac{i_1}{i_2} = \frac{\frac{R_b}{R_1} \cdot i}{\frac{R_c}{R_2} \cdot i} = \frac{R_b}{R_c} \cdot \frac{R_2}{R_1}$$

of which $R_2/R_1$ is obviously a constant. Hence since $i_1$ corresponds to G, the flue gas flow, and $i_2$ to the useful energy $E_1$, the first variable for measuring the value $n$, the excess air, as in Equation 6 above, is independent of the total current $i$, and hence a change in the value of $i$ has no effect on the measurement of the fraction $G/E_1$. It is to be noted that for zero displacement of the sliders, current $i$ is of a maximum value, for example about 200 ma., for maximum displacement thereof current $i$ is of a minimum value of about 100 ma., while for intermediate displacements current $i$ will obviously lie intermediate 100 ma. and 200 ma. in the example, depending directly on the degree of displacement.

The second variable in the determination of the value of $n$ in accordance with my instant invention, namely the temperature function $f(t)$, can, in connection with the flue gas flow G, be represented as a combined variable $G \cdot f(t)$ by currents in a diagonal of the Wheatstone bridge 34 as indicated in Figure 3 but not further explained in connection with that figure. Turning now to the detailed description of the whole of the circuit of apparatus 5, together with its connections to various meters, indicators, recorders and counters, Figure 4 has the potential divider 29 with its slider contact actuated by the flue gas flow meter 13 connected to one side of the source 21 through a resistor 43, while to the other side of the source 21 is connected the potential divider 37 with its slider 36 actuated by the steam flow meter 6 by way of the resistor 44. Resistors 43 and 44 are of equal magnitude and are serially connected between the source and the respective slider to prevent short circuiting the circuit on displacement of the sliders to the fixed terminals 31 and 38 corresponding to zero flow.

Wheatstone bridge 45, connected between terminal 32 and common circuit point 35, has two diagonals 46 and 47 extending from the common point 48 of the bridge arms 49 and 50, of which diagonal 46 connects to the common point 51 of bridge arms 52 and 53, and diagonal 47 connects to a point 54 on the bridge arm 53, which point 54 is electrically spaced from the common point 51 by a series resistor 55. The adjacent bridge arms 49 and 52 are connected from their common point to terminal 32 of the flue gas flow actuated divider 29, with the flue gas resistance thermometer 14, shunted by a predetermined fixed resistor 56, is connected serially in arm 49, and resistance 3 of the intake air supply electrical resistance thermometer, shunted by a second predetermined fixed resistor 57, is serially in arm 52. The other two bridge arms, 50 and 53, contain respectively, each a series resistor 58 and 59, of predetermined and fixed values. In the diagonal 46 there is serially inserted a coil of the efficiency indicating meter 16, a fixed resistor 60 of predetermined value, and a coil of the efficiency recorder 20. The second diagonal 47 has serially connected therein a coil of the excess air indicator 17, a fixed resistor 61, the other resistance 3a of the intake air supply electrical resistance thermometer, and a coil of the excess air recorder 63. Thus while using the identical flow meter actuated current dividers, another indicating current is obtainable. By suitable predetermining the magnitude of the fixed resistors 55, 56, 57, 58, 59 and 61, the current $i_{g1}$ in the diagonal 46 can be made to correspond to the flue gas heat $E_2$, inclusive of the temperature correction factor, as shown in German Patent 714,273. Similarly an appropriate current value $i_{g2}$ is obtainable in the diagonal 47 by appropriate selection of the fixed resistances, which current value will correspond to the product of the flue gas flow G and the temperature function $f(t)$ in the excess air indicator and recorder.

All of the indicating and recording meters, 20, 16, 17 and 63, have a T-coil measuring system, as shown in detail only for the efficiency meter 16, consisting of two independent coils 64 and 65, to which coils the respective currents are supplied by way of meter terminals 1' and 2' for coil 64 and terminals 3' and 4' for coil 65. The corresponding meter terminals of meters 17, 63 and 20 are double, triple and quadruple primed, respectively, for more accurate identification in Figure 4. Thus in meter 16, its coil 64 is supplied with current $i_{g1}$ from the diagonal 46 while its coil 65 is supplied with current $i_2$ across resistor 66; whereas coil 64 of the air excess indicator 17 is supplied with current $i_{g2}$ from diagonal 47, and its coil 65 with current $i_2$ across fixed resistor 68. The pairs of fixed resistors and potentiometers, 66 and 67, 68 and 69, 70 and 71, and 72 and 73, serially inserted between terminal 39, corresponding to maximum steam flow, and the second common point 42 of the circuit, are for the purpose of imparting to the respective coils 65 of the indicators, recorders and counters, a proper portion of current $i_2$, namely that for which they have been calibrated, the individual potentiometers permitting of fine adjustment thereof.

Figure 5:
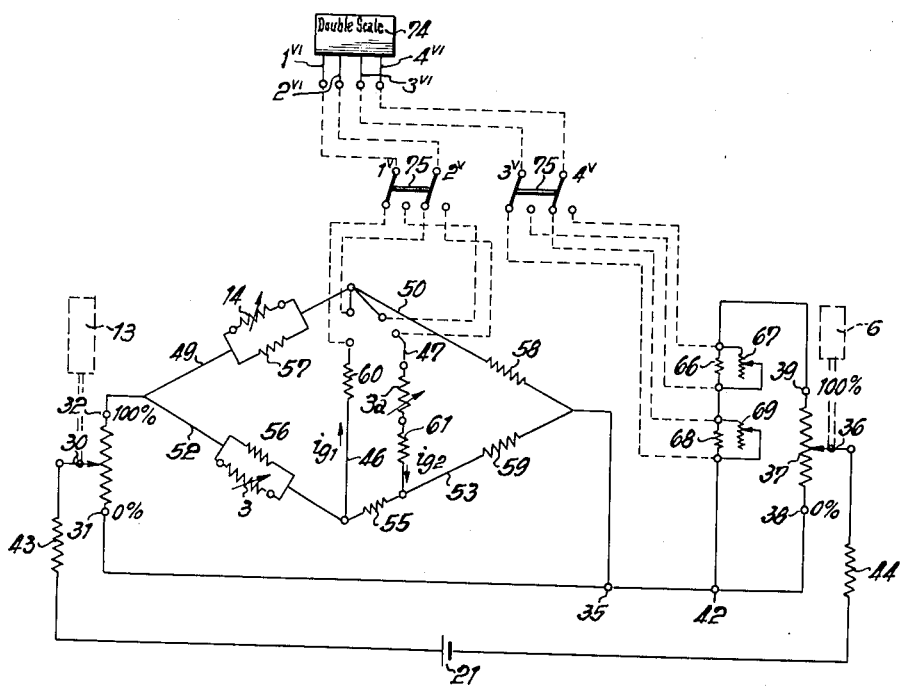
Figure 5 is the electrical circuit of a modified form of the illustrative embodiment of Figure 4 in which a single meter can selectively indicate the excess air and the efficiency measurements.

The efficiency indicator 16 and the excess air indicator 17 of Figures 1 and 4 may be combined into a single meter 74 having a double scale, one calibrated to indicate efficiency and the other excess air, as shown in Figure 5. While the circuit of Figure 5 is the same as that of Figure 4, some of the elements have been omitted in Figure 5 for ease of understanding. A gang switch 75, having two positions for each of its terminals $1^v$, $2^v$, $3^v$, and $4^v$ connected to the meter terminals $1^{v'}$, $2^{v'}$, $3^{v'}$, and $4^{v'}$, is interposed between the meter 74 and the circuit elements of the apparatus 5, the meter 74 being of T-coil construction as above discussed in detail for efficiency meter 16. In the position of the switch 75 shown in Figure 5, the meter will indicate efficiency, while when thrown to its other position, as is perfectly obvious in view of the detailed description of the circuit of Figure 4, the meter 74 will indicate excess air.

I claim:

1. Electrical indicating circuit for heating plants combusting a fuel and air and imparting heat to an output fluid, comprising a pair of potential dividers each having a slidable contact mechanically displaceable between two fixed end terminals of the divider, a vapor flow meter connected mechanically to each divider slidable contact to displace such contact in accordance with the instantaneous measurements of the particular flow meter so that at minimum flow the slidable contact engages one fixed end terminal and at maximum vapor flow the other fixed end terminal of the divider, one of the vapor flow meters being responsive to the flue gas flow and the other to the output steam flow of the heating plant, a source of current potential connected between the pair of slidable contacts, a conductive connection between the two fixed end terminals of the dividers engaged by the slidable contacts on minimum vapor flow, a Wheatstone bridge connected between a point on the conductive connection and the divider fixed end terminal corresponding to maximum vapor flow of which divider the slidable contact is displaceable by the exhaust gas flow meter, the two bridge arms of which the common point is connected to said divider fixed end terminal each including a variable resistor responsive to a temperature, one to the temperature of the flue gas and the other to that of the intake air supplied to support combustion, the other two bridge arms of which the common point is connected to the point on the conductive connection each including a fixed magnitude resistor, a first bridge diagonal connecting the other two common arm points to each other, a second bridge diagonal connecting from one of said other two common arm points to a point other than the other of said other two common arm points on one of the arms having said other common point as its common point, a measuring indicator having a main driving coil and an auxiliary driving coil on a common frame and reacting with a common magnetic structure and adapted to oppose each other in their direction of drive of the common frame, a resistor responsive to the temperature of the intake air supplied for the combustion in one of the diagonals, first connections electrically inserting the main driving coil in the diagonal containing the temperature responsive resistor at least one resistor of fixed magnitude connected between the fixed end terminal of the divider of which the sliding contact is displaced by the vapor flow meter responsive to the steam flow corresponding to maximum steam flow and the said point of the conductive connection, and second connections connecting the last mentioned resistor of fixed magnitude in shunt of the auxiliary driving coil, whereby the indicator indicates the amount of excess air supplied for the combustion.

2. Electrical indicating circuit according to claim 1 in which the diagonal not including the resistor responsive to the temperature of the intake air supplied for the combustion includes a resistor of predetermined fixed magnitude, a second measuring indicator having a main driving coil and an auxiliary driving coil on a common frame and adapted to react with a common magnetic structure in opposing frame driving directions, third connections inserting the main driving coil of the second indicator in the diagonal including the resistor of predetermined fixed magnitude, a second resistor of predetermined fixed magnitude connected in series with the at least one resistor of fixed magnitude connected between the fixed end terminal corresponding to maximum steam flow of the divider of which the slidable contact is displaced by the vapor flow meter responsive to the steam flow, and fourth connections connecting said second resistor in shunt of the auxiliary driving coil of the second indicator, whereby the second indicator indicates the efficiency of the combustion.

3. Electrical indicating circuit according to claim 2 in which a third and a fourth resistor each of fixed predetermined magnitude are connected in series with the at least one resistor of fixed magnitude and the second resistor of predetermined fixed magnitude between the fixed end terminal corresponding to maximum steam flow of the divider of which the slidable contact is displaced by the vapor flow meter responsive to steam flow, a first and second recording indicator, each recording indicator having a main driving coil and an auxiliary driving coil on a common frame and adapted to react with a common magnetic structure in opposing frame driving connections, fifth connections inserting the main driving coil of the first recording indicator in series in the diagonal including the resistor responsive to the temperature of the intake air supplied for combustion, sixth connections connecting the third resistor in shunt of the auxiliary driving coil of the first recording indicator, seventh connections inserting the main driving coil of the second recording indicator in series with the other bridge diagonal, and eighth connections connecting the fourth resistor in shunt of the auxiliary driving coil of the second recording indicator.

References Cited in the file of this patent

UNITED STATES PATENTS

| | | |
|---|---|---|
| 1,885,378 | Roe | Nov. 1, 1932 |
| 2,293,403 | Razek | Aug. 18, 1942 |
| 2,305,769 | Germer | Dec. 22, 1942 |
| 2,593,661 | Dickey | Apr. 22, 1952 |